United States Patent [19]

Soda

[11] Patent Number: 5,196,088
[45] Date of Patent: Mar. 23, 1993

[54] PROCESS AND APPARATUS FOR PRODUCING NON-GLARE GLASS BY ETCHING

[75] Inventor: Ken Soda, Chicago, Ill.

[73] Assignee: Tru Vue, Inc., Chicago, Ill.

[21] Appl. No.: 706,551

[22] Filed: May 28, 1991

Related U.S. Application Data

[60] Continuation of Ser. No. 431,616, Nov. 3, 1989, abandoned, which is a division of Ser. No. 333,317, Apr. 4, 1989, abandoned, which is a continuation-in-part of Ser. No. 228,468, Aug. 5, 1988, abandoned.

[51] Int. Cl.⁵ .............................................. C03C 15/00
[52] U.S. Cl. .................................. 156/631; 156/663
[58] Field of Search ............... 156/99, 152, 344, 584, 156/629, 630, 631, 663; 428/40

[56] References Cited

U.S. PATENT DOCUMENTS

| | | | |
|---|---|---|---|
| 243,199 | 6/1881 | Bradley | 156/631 |
| 1,997,375 | 4/1935 | Naruse | 41/42 |
| 2,220,862 | 11/1940 | Blodgett | 156/630 |
| 2,338,233 | 1/1944 | Dimmick | 88/1 |
| 2,439,999 | 4/1948 | Adams | 156/630 |
| 2,461,840 | 2/1949 | Nicoll | 41/42 |
| 2,593,396 | 4/1952 | Beck | 156/629 |
| 2,689,804 | 9/1954 | Sadowsky | 117/64 |
| 3,114,668 | 12/1963 | Guiles | 161/116 |
| 3,234,068 | 2/1966 | Masuda et al. | 156/663 X |
| 3,326,715 | 6/1967 | Twells | 117/124 |
| 3,374,130 | 3/1968 | Junge et al. | 156/24 |
| 3,374,141 | 3/1968 | Junge et al. | 161/1 |
| 3,481,812 | 12/1969 | Holub et al. | 156/629 |
| 3,505,051 | 4/1970 | Buckley et al. | 65/60 |
| 3,799,817 | 3/1974 | Van Laethem | 156/629 |
| 4,019,884 | 4/1977 | Elmer et al. | 65/31 |
| 4,411,731 | 10/1983 | Miller | 156/631 |
| 4,434,191 | 2/1984 | Cook et al. | 428/410 |
| 4,578,100 | 3/1986 | Breininger | 65/608 |
| 4,636,439 | 1/1987 | Breininger | 428/428 |
| 4,797,317 | 1/1989 | Oliver et al. | 428/441 |
| 4,802,737 | 2/1989 | Denton | 428/428 |

FOREIGN PATENT DOCUMENTS

| | | | |
|---|---|---|---|
| 102412 | 11/1937 | Australia | 52.8/46.5 |
| 1270379 | 11/1986 | Japan | 156/631 |

*Primary Examiner*—Thi Dang
*Attorney, Agent, or Firm*—Robert E. Browne; Thomas C. McDonough

[57] ABSTRACT

A process is disclosed for simultaneously etching only one side of at least two sheets of glass to reduce specular reflectance on the etched side while improving resolution and process efficiency. In the process, two face to face sheets of glass are aligned and a seal is formed to render the adjacent inside faces of the glass sheets substantially fluid-tight during the etching process. The sealed sheets are then transferred to an etching bath where their outside faces are etched, but their inside faces are not visibly etched.

8 Claims, 10 Drawing Sheets

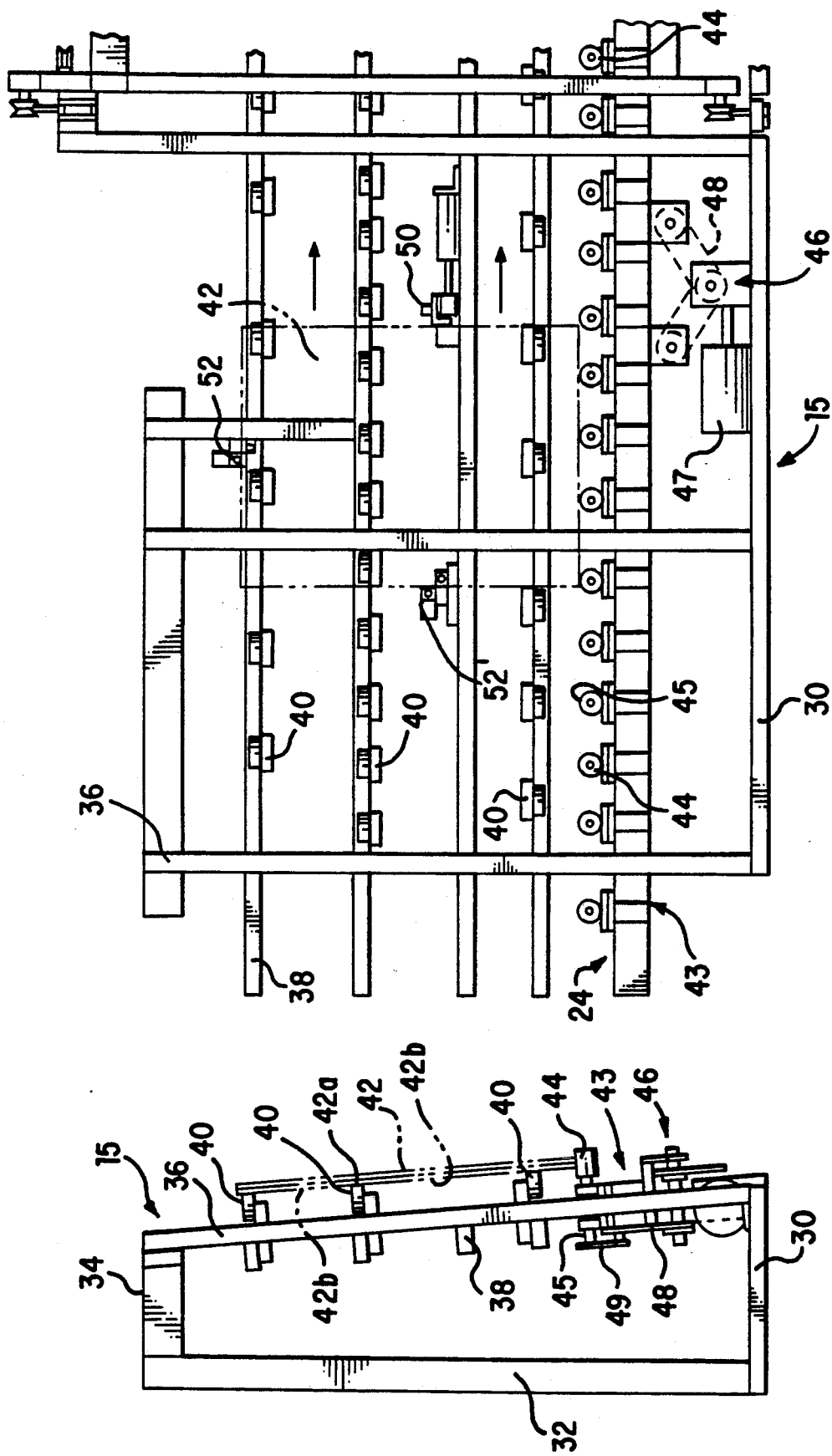

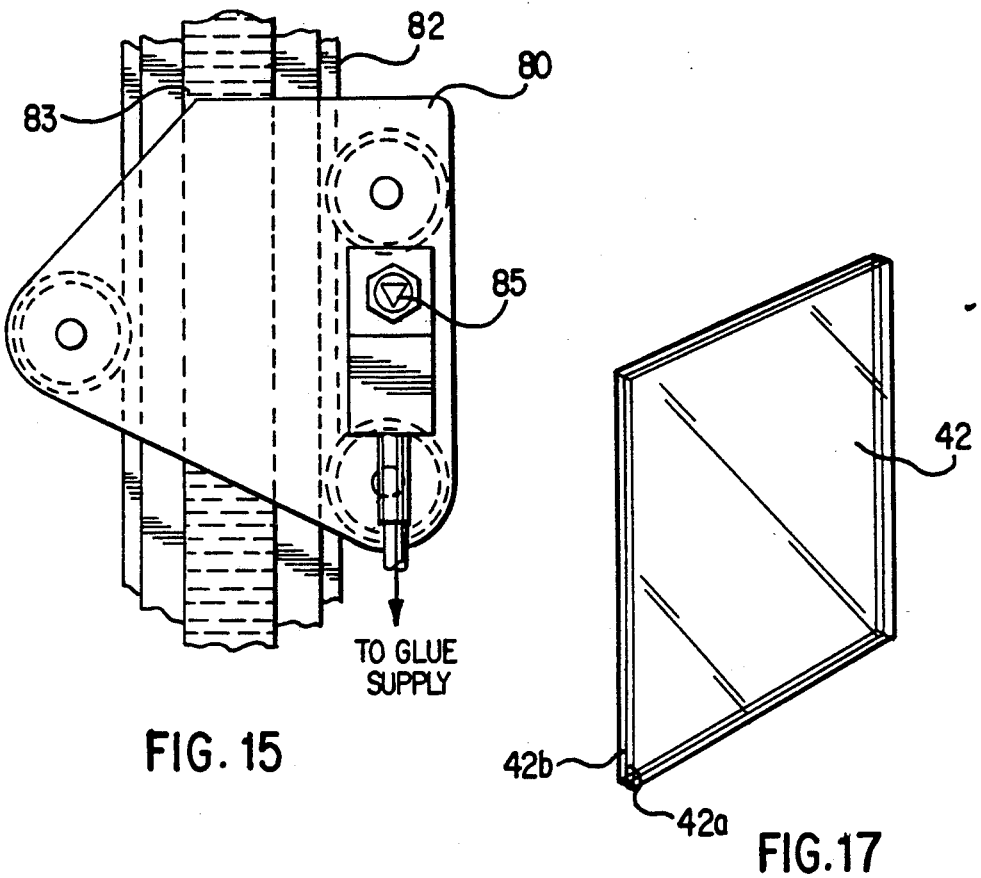
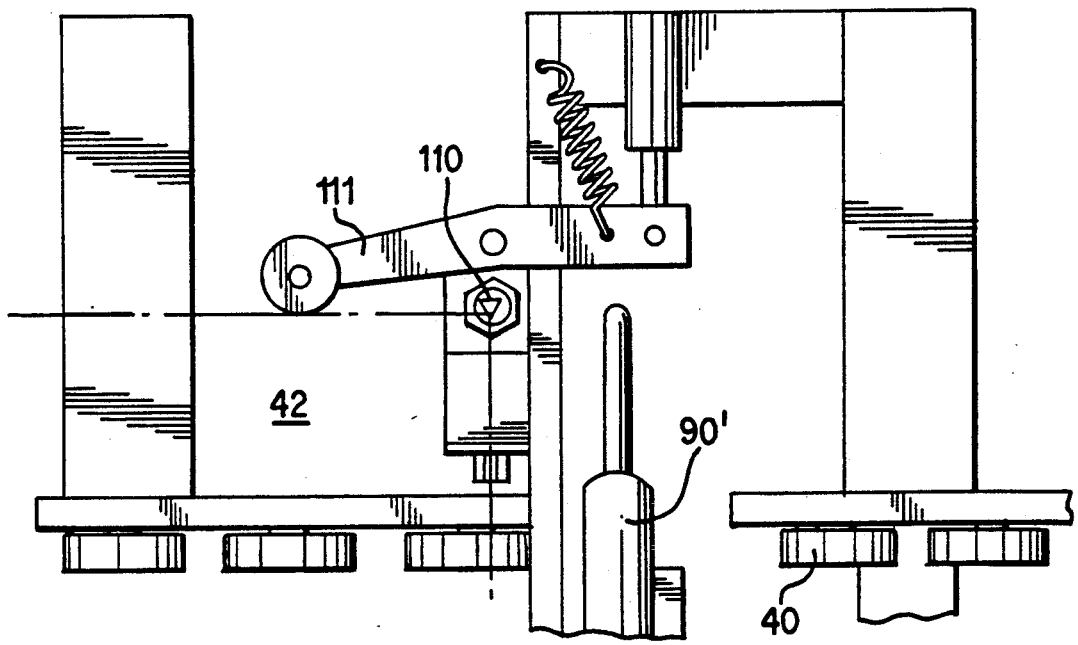

PROCESS AND APPARATUS FOR PRODUCING NON-GLARE GLASS BY ETCHING

This is a continuation of application Ser. No. 07/431,616 filed Nov. 3, 1989, now abandoned, which is a division of application Ser. No. 07/333,317, filed Apr. 4, 1989, now abandoned which is a continuation-in-part of application Ser. No. 07/288,468, filed Aug. 5, 1988, now abandoned.

BACKGROUND OF THE INVENTION

This invention relates to a process and an apparatus for etching glass, and, in particular, transparent glass, in order to reduce its reflectance. Glass products are etched for a variety of reasons today, but many of these reasons arise from the need for reducing the visible specular reflectivity of the glass. Use of low specular reflectance or "non-glare" glass has become almost a necessity in face plates for television screens and monitors for computers. It is also in high demand for use in picture framing glass to reduce the glare created by the reflection of light incident upon the surface of glass covering works of art, photographs, posters and the like.

One common means of reducing the reflectivity of generally large or rectangular sheets of glass has been to etch such glass sheets as generally described in U.S. Pat. No. 3,374,130 to Junge. In the etching process, a glass sheet is suspended from a rack and then dipped, for a predetermined time period, in an etching bath containing a solution of hydrofluoric acid and ammonium bifluoride. In some baths, a glycol and/or sugar may be added to control the viscosity of the bath and produce a finer etch. The temperature and mixture of components in the bath must be carefully controlled to achieve a good quality etch. The etching solution creates small irregularities in the surface of the otherwise smooth glass which scatter the reflected light so as to reduce glare. Variations of the etching process are taught by various patents, including U.S. Pat. No. 3,374,141 issued to Pittsburgh Plate Glass Company. Other methods of reducing glare include the application of coatings of metal oxides, such as aluminum oxide compositions by deposition to glass surfaces. Such coatings have a refractive index between that of the glass and the air and thereby act to decrease reflectivity. The coating process is taught in U.S. Pat. No. 2,338,233 issued in 1944 to G. L. Dimmick, among others.

Even with the greatest possible control over the etching process, including the ingredients of the bath, the creation of surface irregularities on both sides of the glass sheet by the acid etch will reduce the resolution and the optical clarity of the glass which is etched. In addition, processes of coating by deposition or otherwise require multiple layers of materials and substantial time and expense to produce. Thus, manufacturing non-glare glass using these methods may not be economically justifiable depending upon the use of the resulting products, as for example, in picture framing glass.

While there have been attempts to improve resolution by etching or treating only one side of a sheet of glass, this has generally been done by applying a protective paste by hand to the side which is not to be etched. The paste will not react with the etch bath and prevents the bath from contacting the underlying glass surface. However, after dipping in the etching bath, the paste must be removed from the glass surface, thereby substantially slowing the entire manufacturing process. Non-glare surfaces have also been created by casting procedures, which are entirely different from the etching procedure described in this application. Such procedures and the deposition of coatings, as described above, all involve substantial preparation, time and expense and are, therefore, not desirable for use i manufacturing non-glare picture framing glass or even screens for certain televisions and video monitors.

It is an object of the present invention to provide an economical, highly automated apparatus for etching generally, but not limited to, rectangular sheets of glass on a single side.

It is a further object of this invention to provide an apparatus for etching at least two sheets of glass simultaneously and thereby improving manufacturing efficiency and economy.

One more object of the invention is to provide a process for reducing the glare from a glass surface while improving the resolution of the glass treated by the process.

It is still another object of the invention to provide a process for introducing multiple sheets of glass into an etching solution and etching at least one surface of each sheet of glass simultaneously to reduce glare.

It is still a further object of this invention to provide a process and apparatus in which more than one sheet of glass may be simultaneously etched, but on one side only, in order to reduce glare while improving resolution.

It is yet another object of this invention to provide a process and apparatus by which sheets of glass to be etched are sealed in face to face relationship, to allow etching of such sheets of glass on opposite outer faces thereof in an etching bath.

Yet another object of this invention is to produce a sheet of glass or glass article which has been selectively etched on one side only by an immersion process in order to reduce glare while improving resolution.

SUMMARY OF THE INVENTION

This invention is directed to a process and apparatus for selectively etching only one side of a sheet of glass by an immersion process. The product produced is a non-glare glass having improved resolution compared to existing two-sided etch products.

The process involves placing at least a first sheet of glass and a second sheet of glass having corresponding edges of similar dimensions in face to face relationship. The sheets of glass are maintained in close proximity, and dipped into an etching solution to visibly etch only one side thereof.

The two sheets of glass may be joined in a substantially fluid-tight relationship; however, some leakage may be tolerated. The joined sheets are then dipped into an etching solution such that only one side of each sheet of glass is etched.

This invention solves the problems inherent in prior etching processes and in equipment previously used in connection with etching generally flat rectangular sheets of glass. In one embodiment, the outer edges of at least two sheets of glass are temporarily sealed and placed in face to face relationship, with a substantially impermeable, strippable glue that is resistant to the acidic solution in a conventional glass etching bath. The glass sheets to be etched are placed in face to face relationship and automatically sealed along their perimeter or interfacing top, bottom and side edges by glue guns mounted at sealing stations disposed along conveying means which transport the sealed glass sheets to an etching bath. The acid etching solution etches the glass sheets only on their outer faces, since it is prevented by the generally fluid-tight glue seal around the edges of the sheets from etching the inner faces of the glass. After the glass sheets are removed from the etching bath, they are thoroughly rinsed. The sealing glue may be quickly and easily mechanically stripped from about the edges or perimeter of the glass sheets. The glass sheets are then separated, washed and packaged for distribution.

By this process and apparatus, a fine etch may be achieved on only one side of each sheet of glass. Further, the two sheets of glass are etched at the same time, thus substantially increasing the speed or productivity of prior etching operations and reducing material costs per unit of production. In addition, because the inside face of the glass sheet is not etched, the resolution of the glass is greatly enhanced.

Further improvements in resolution result when the side of the sheet of glass to be etched is chosen to be the side of the glass that was in contact with a molten tin bath during its manufacture. This improvement in resolution results from a reduction in the extent of the surface etching and the depth of the roughness features etched into the glass. It is also postulated that the average distance between the features is less and contributes to the smooth surface texture.

This fine etch may be accomplished on the other side of the glass through the use of etch bath with weaker concentration of acids or reduced times. It was found however that these processes were less reproducible than the etch on the tin-contact surface.

Typically the selective etch yielded a factor or 2 of more improvement in resolution with an increase of only 10-15 percent in reflected glare.

The subject invention overcomes manufacturing problems inherent in present etching processes, while producing a superior product in less time. It has been found that the glass produced by this product has a resolution which complies with U.S. Air Force standards for etched glass to be used in military apparatus. It also complies with private manufacturers' standards for glass to be used as face plates in video monitors.

BRIEF DESCRIPTION OF THE DRAWINGS

FIG. 3 is a front elevational view of a portion of the conveying and registration assembly used in this invention and taken generally from section 3 in FIG. 1.

FIG. 4 is a side elevational view of the assembly shown in FIG. 3.

FIG. 15 is an enlarged elevational view of a glue gun for vertical sealing shown generally in FIGS. 1 and 5.

FIG. 16 is an enlarged view of a glue gun for horizontal sealing shown generally in FIGS. 1 and 7.

FIG. 17 is a partial isometric view of two face to face sheets of glass having their edges sealed according to this invention.

DESCRIPTION OF THE PREFERRED EMBODIMENT

Figure 1:
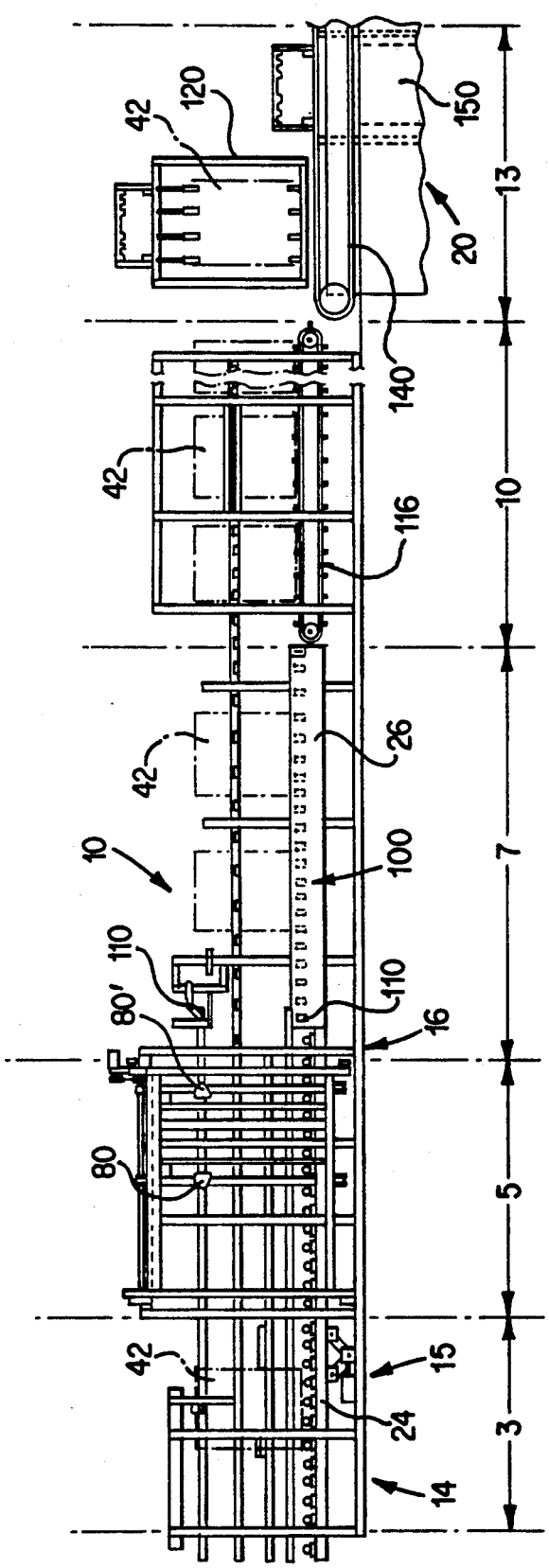
FIG. 1 is a front elevational view of an assembly line using the apparatus and process of the present invention, showing the various stations and apparatus used in connection with the etching process described in this application.
Figure 2:
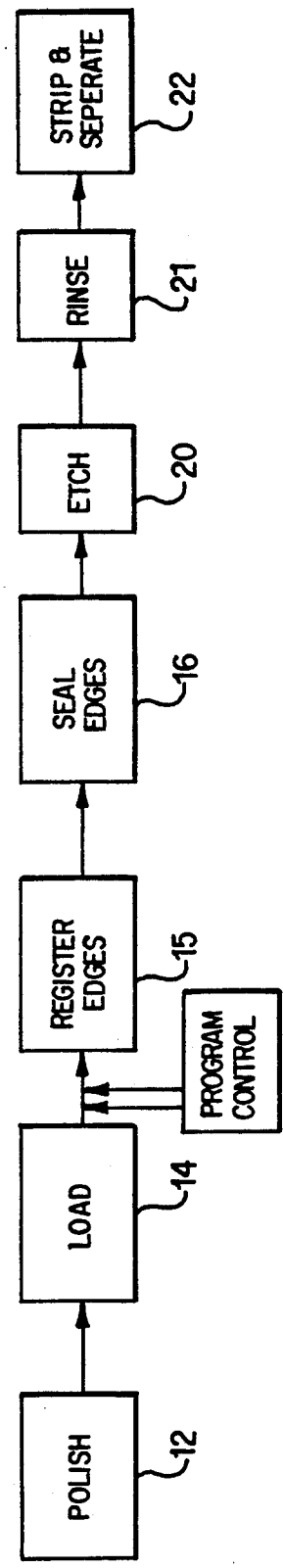
FIG. 2 is a process flow diagram for the production of etched glass, including the process of the present invention and the additional step of polishing glass, which is preferred from a quality standpoint.

Referring now to the drawings, there are shown preferred embodiments of the processes and apparatus of the present invention. FIG. 1 shows the present invention included in an assembly line 10 that results, in its last step, in etching of two face to face sheets of glass on only one side of each sheet. FIG. 2 illustrates, for schematic purposes, an overall process of etching glass which includes the process of this invention as practiced by the above assembly, including the apparatus of this invention. The process shown in FIG. 2 includes a cleaning and polishing step 12, which is not shown in FIG. 1, but which is known in the art and is considered desirable because this preparation of the glass will result in a finer quality homogeneous finished product. In polishing, a sheet of flat glass is laid in a horizontal position in a polishing machine, which is commercially available. This machine washes and buffs the glass to place it in condition for etching. After a glass sheet moves through the polishing machine, it is transferred in a loading step 14, which can be either manual or automated, to a first conveying means, as will be described below. In the loading step 14, of the present invention, two polished pieces of glass are placed with their cut edges facing one another, which will result in the surfaces of the uncut edges being to the outside. As explained below, this will also provide a better quality finished product.

Generally speaking, the weaker an etch bath the more difficult it will be to achieve a consistent etch across the glass surface. For example, envisage an etch bath with all water and one molecule of etching formula. This bath is very weak and will etch only where the one molecule is, leaving a very inconsistent etch. As the etch bath becomes stronger, the etching process achieves its highest level of consistency. Since an etch bath will not only roughen a surface but also polish a roughened surface, at a certain point an equilibrium stage is reached between etching and polishing, and the etch will be completely consistent and will not change no matter how long the glass is immersed. This stage is known as "terminal etch".

Further, the rougher the glass surface, the lower is its reflectance at an angle of 60 degrees to the surface (gloss). Typically, as is known in the art, the gloss level may be measured by an instrument called a 60 degree glossmeter. The lower the gloss level or reflectance, the more disrupted is the reflected image. However, as the surface becomes rougher, images viewed through the glass become distorted so its resolution declines. Generally, if two-sided etched glass has a resolution of 1.1 to 1.4 (as determined by the U.S. Air Force 1951 resolution target viewed ¾ of an inch away), which is similar to a frosted shower door in appearance, its resolution is quite poor. (A standard method of determining the resolution is to use the U.S. Air Force resolving power target 1951 at a specified distance between the target and the transparent material, i.e. the glass. The values available for this test range between −2.0 and +3.0 with the more positive number being more desirable.)

The untrained human eye has great difficulty in perceiving the difference in roughness between a gloss level of 50 percent and a gloss level of 80 percent (light reflection measured by a 60 degree glossmeter against a black, totally non-reflective background). Thus, the observed level of non-glare performance provided by the lower gloss level is equivalent to the higher gloss level. However, resolution or clarity changes radically between gloss levels 50 and 80 percent. A gloss of 80 percent is associated with a resolution of approximately 3.0 on the Air Force resolution standard while a gloss of 50 percent has a resolution of approximately 1.0.

The problem then is that a consistent etch is most easily delivered with a strong etch bath for a long time, but it produces a low gloss level and poor resolution. So the struggle for producers of non-glare glass is that the easiest product to make has poor resolution, while the higher-performance product cannot be made consistently.

Raw glass produced by the float process has two sides with different characteristic—the "air" or cut side, which was exposed to hydrogen and nitrogen gas in the float tank, and the "tin" or uncut side, which actually floated on the tin bath in the float tank. For etching purposes the two sides are radically different in their properties.

The tin side is much more resistent to etch. The reason for this is not known but is hypothesized to be that some level of tin or tin oxide is impregnated into the glass when it is forming on the float bath, and tin or tin oxide is a known resist to acid etching. The air side, by contrast, etches much more easily.

Etching by an immersion process to date has meant etching both sides of the glass. Since the air side of the glass etches fastest, it achieves a low gloss level quickly while the tin side etches more slowly, producing different levels of gloss on the two sides. However, the air side will always etch preferentially due to its properties, so the strength of the bath is matched to the air side as far as optical characteristics are concerned.

In accordance with the present invention, the side of the glass to be etched can be preferentially selected. All things being equal, a stronger bath will etch more consistently than a weak bath. Thus, to get a consistent etch, it is desirable to etch the tin side, since a stronger bath can be used as compared to the air side for whatever target optics are needed.

Since the tin side may be selectively etched, a stronger bath can be used, producing less roughening of the surface due to the tin resist. Less surface roughening results in higher gloss and higher resolution. Also the consistency of the etch, due to the strength of the bath, means that the process is reproducible and yields uniform, cosmetically appealing glass parts.

Time is also a factor, and can be used like bath strength; that is, the longer in the bath the more consistent the etch, and also the darker it is.

Etching the tin side allows a longer etch also, all other things being equal. Therefore, the above comments regarding bath strength also apply to length of immersion in the bath.

By using the single-sided etch process of the present invention and selectively etching the tin or uncut side in a conventional glass etching bath, glass sheets can be consistently etched to a gloss level of between about 70 and 85 percent achieving a resolution of at least about 2.0 and preferably between 2.4 and 2.6 or better, when viewed at a distance of ¾ inches between the U.S. Air Force 1951 target and the glass. The unetched side, i.e. the cut or air side, may have a gloss value of about 90 percent or higher. This represents a high resolution non-glare surface via an immersion process that still provides non-glare protection.

Glare reduction is best evaluated by measurements of specular reflection at normal incidence. The usual instrument for measuring this is a spectrophotometer which measures this value as a function of the wavelength of light.

Figure 19:
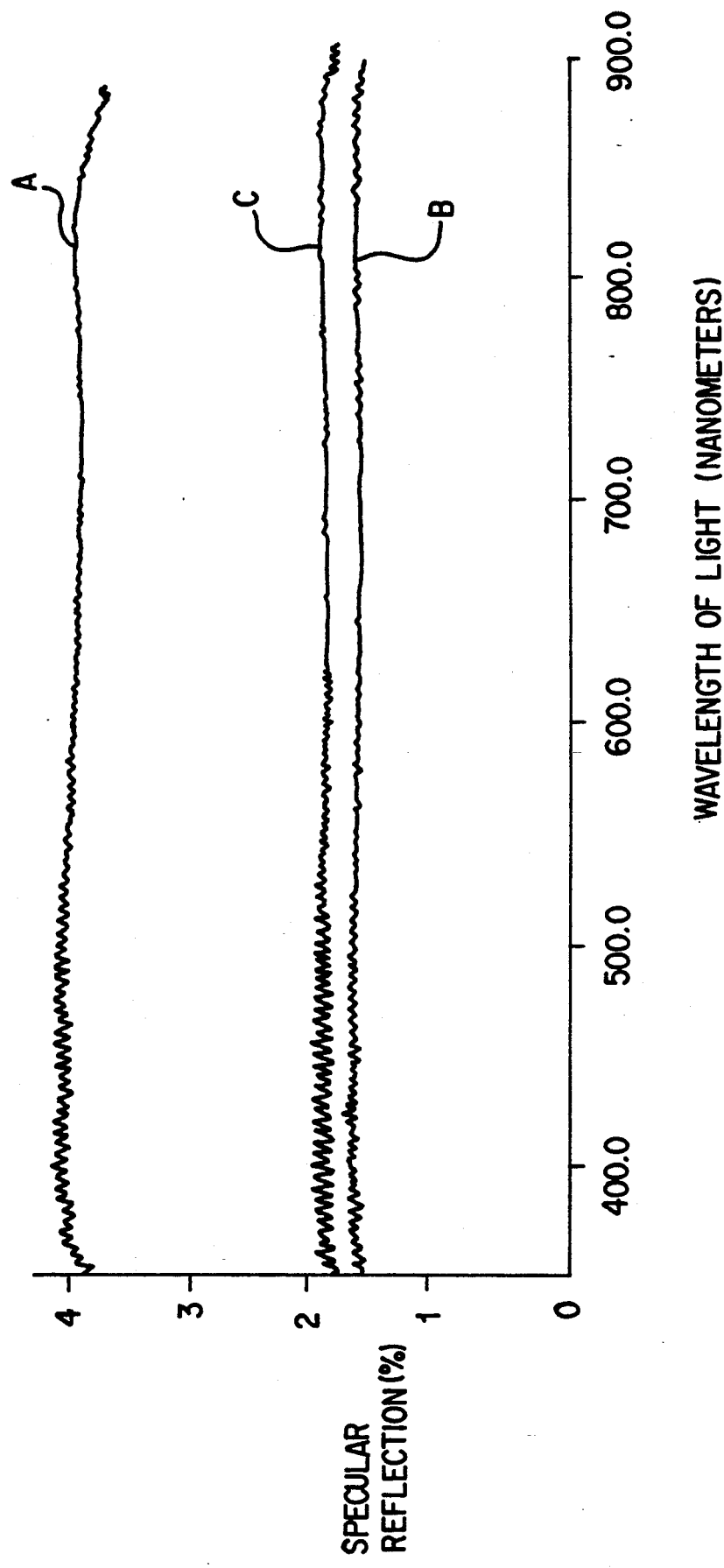
FIG. 19 graphically represents measurements of specular reflection.

In FIG. 19 we show the measurements of specular reflection versus wavelength for a plain glass surface (curve "A"); a surface treated by a conventional etch or "terminal etch" process (curve "C"); and the high resolution selective etch (curve "C"). As can be seen from curves "B" and "C", the glare reduction properties produced by the different processes are substantially the same.

Referring again to FIG. 2, after the loading step, the two face to face sheets of glass are then registered, or aligned in step 15, so that the horizontal and vertical edges of each are aligned as closely as possible. They are then moved to the sealing step 16. In the sealing step 16, the registered side edges of the facing glass sheets are joined and sealed with a bead of an etchant resistant glue composition. Then, the top and bottom edges of the adjacent glass sheets are joined and sealed with the same glue mixture. The sealed glass sheets are then conveyed to the etching station 20 where they are dipped into a bath containing the acid etching solution for the predetermined period of time. After the glass sheets are removed from the bath and rinsed in a rinsing station 21, they are brought to a stripping station 22 where the glue is stripped and the glass sheets are separated. After the glass sheets have been separated, they may be washed to remove any acid residue, dried, inspected for flaws and placed in containers for shipment.

The steps in the above-described process include the aligning of at least two glass sheets in a face to face relationship and the sealing of said adjacent sheets about their aligned edges or perimeter by an appropriate sealing means which not only holds the sheets together, but also prevents the etching solution from attacking and affecting the inside adjacent faces of the glass sheets. While a hot glue mixture is the preferred sealant used in this invention, any type of equivalent sealing means resistant to corrosion by the etching solution and providing substantially fluid-tight sealing, such as tape, plastic beading or even flexible frames or carriers into which more than two sheets of glass could be inserted, could be used.

An assembly line apparatus for producing a one-sided etched glass product is shown, in general, at 10 in FIG. 1. This assembly line 10 broadly includes a first conveying means 24 and a second conveying means 26 which move the glass automatically from the loading station 14 to the etching station 20. It would be possible to link the polishing station 12 and the strip and separating station 22 by automated conveying means, if desired. The assembly 10 itself is constructed generally of rigid horizontal and vertical frame members, such as angles or tubing, which function to support the conveying means, sealing means and other active sections.

The loading station 14 is shown in detail in FIGS. 3 and 4. The loading station 14 consists of the generally rectangular frame which is used throughout the assembly 10. The frame includes a base member 30, a substantially vertical rear member 32, a top member 34 and an inclined front member 36. The front member 36, in turn, supports a series of spaced horizontally extending stringers 38 on which are mounted a series of rollers 40 freely rotatable about vertical axes. These rollers 40 are designed to support the rectangular sheets of glass shown at 42 (in hidden lines) in their travel along the assembly 10. The assembly generally includes a series of top rollers, mid rollers and bottom rollers to contact the horizontal face of a sheet of glass at least three points. The bottom edges of the sheets of glass are supported and the glass 42 is moved by a first conveying means 24, which includes a series of spaced driven rollers 44 mounted on horizontal axes 45. These driven rollers 44 are caused to rotate by a driving means 46 which is generally shown as a motor 47 linked by pulleys, belts or chains 48 to a chain 49, moving axes 45. Any suitable equivalent means could be used.

The glass sheets or plates 42 loaded on rollers 44 at loading station 14 consist of an outer sheet 42a and an inner sheet 42b. Sheet 42b is first placed on rollers 44 and laid against the edge of rollers 40 where it is held in position by gravity because of the slight rearward incline of member 36. Plate 42b is placed (with its cut side inside) against the edge of the rollers 40, so that the more desirable uncut side is to the outside. Sheet 42a is then similarly placed on rollers 44 with its cut side face adjacent the cut side face of sheet 42b. The two sheets shown as 42 are then moved toward the right along the assembly by the rotation of driven rollers 44, until they come into contact with registration means 50 which extends outwardly from the plane of member 36 and impedes the further movement of glass sheets 42. The driven rollers 44 push the glass plates 42 into right edge alignment against registration means 50. The top edge alignment and left edge alignment of sheets 42a and 42b are checked by sensing means 52 and 52' which transmit a signal to the operator or controller, if for some reason, one sheet of glass is above or below the limit switch, beam or other comparable detecting means generated by sensing means 52 and 52'. Registration means 50 is activated to move into and out of the path of travel of glass sheets 42 by any suitable valve means, such as an air-operated valve, which is, in turn, actuated by the overall manufacturing program which controls this process (see FIG. 2). Once registration has occurred at the loading station 14, the glass sheets 42a and 42b which, with their perimeters or edges aligned become as one sheet 42, are allowed to move to the sealing stations 16.

Figure 18B:
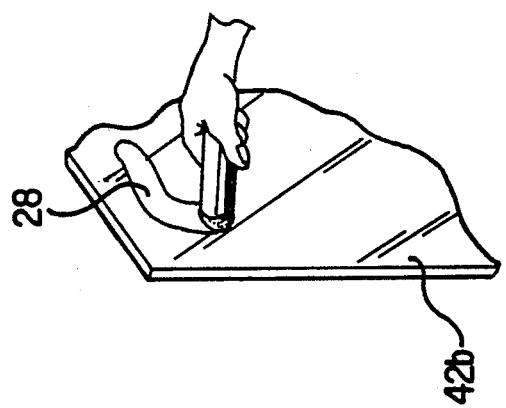
FIGS. 18A and 18B schematically illustrate the step of joining the glass sheets by viscous liquid/capillary attraction.
Figure 18A:
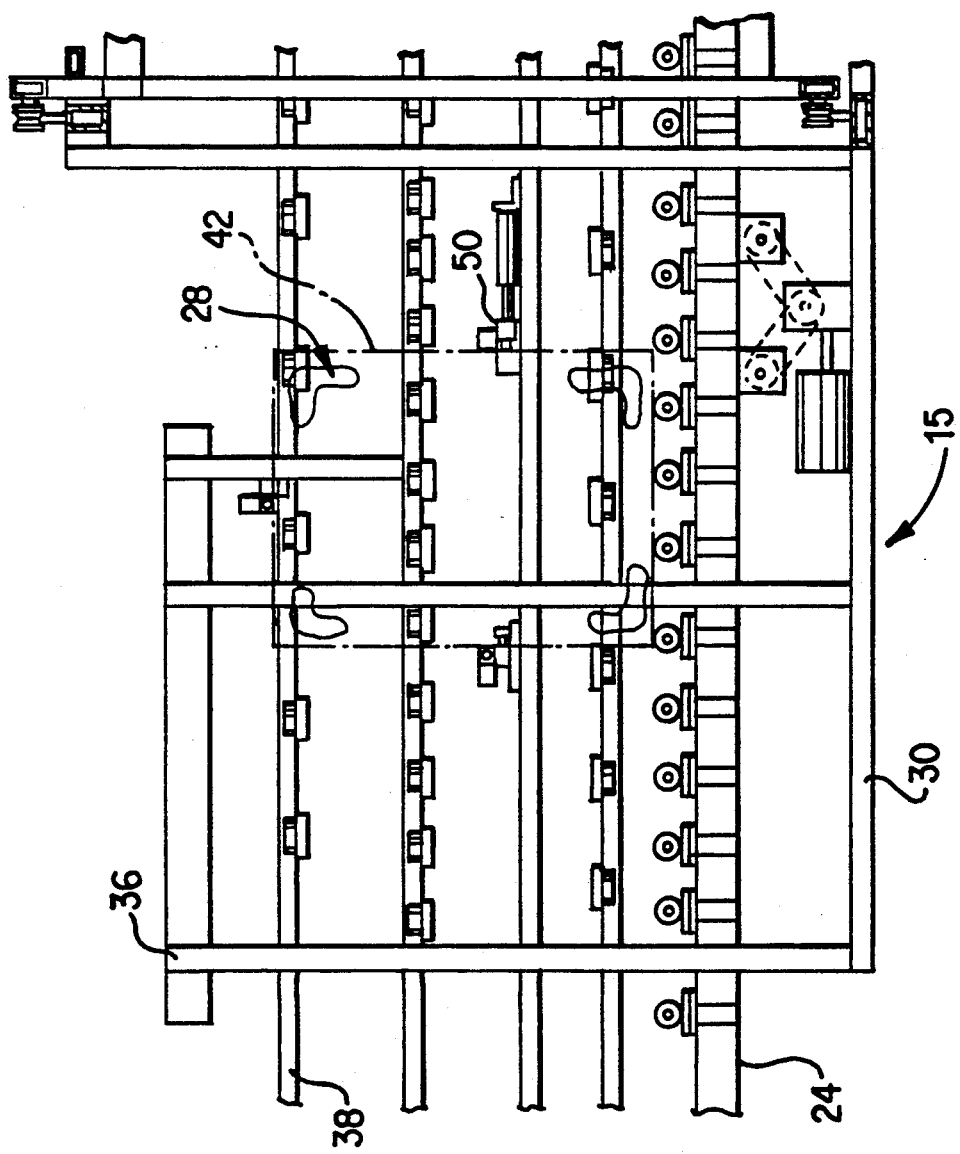

Also at loading station 14, a viscous liquid 28, such as liquid sorbitol, (see FIGS. 18A, 18B) may be manually applied at the corner areas of the inside face of one of the glass sheets, for example sheet 42b. The other glass sheet, for example sheet 42a, is placed against the sheet with the viscous liquid thereon, and the two sheets are pressed together. The sheets joined in this manner are then conveyed to the registration station 15. Thereafter, the glass sheets may be passed through pinch rollers 29 (see FIG. 5) in order to exclude air from between the sheets.

The viscous liquid assists in holding the two sheets of glass together prior to the sealing step 16. It assists in excluding air from between the sheets, and holds the sheets together by capillary attraction. In some instances, the sealing step 16 may be eliminated, and then only the viscous liquid is utilized to join the sheets of glass.

Figure 5:
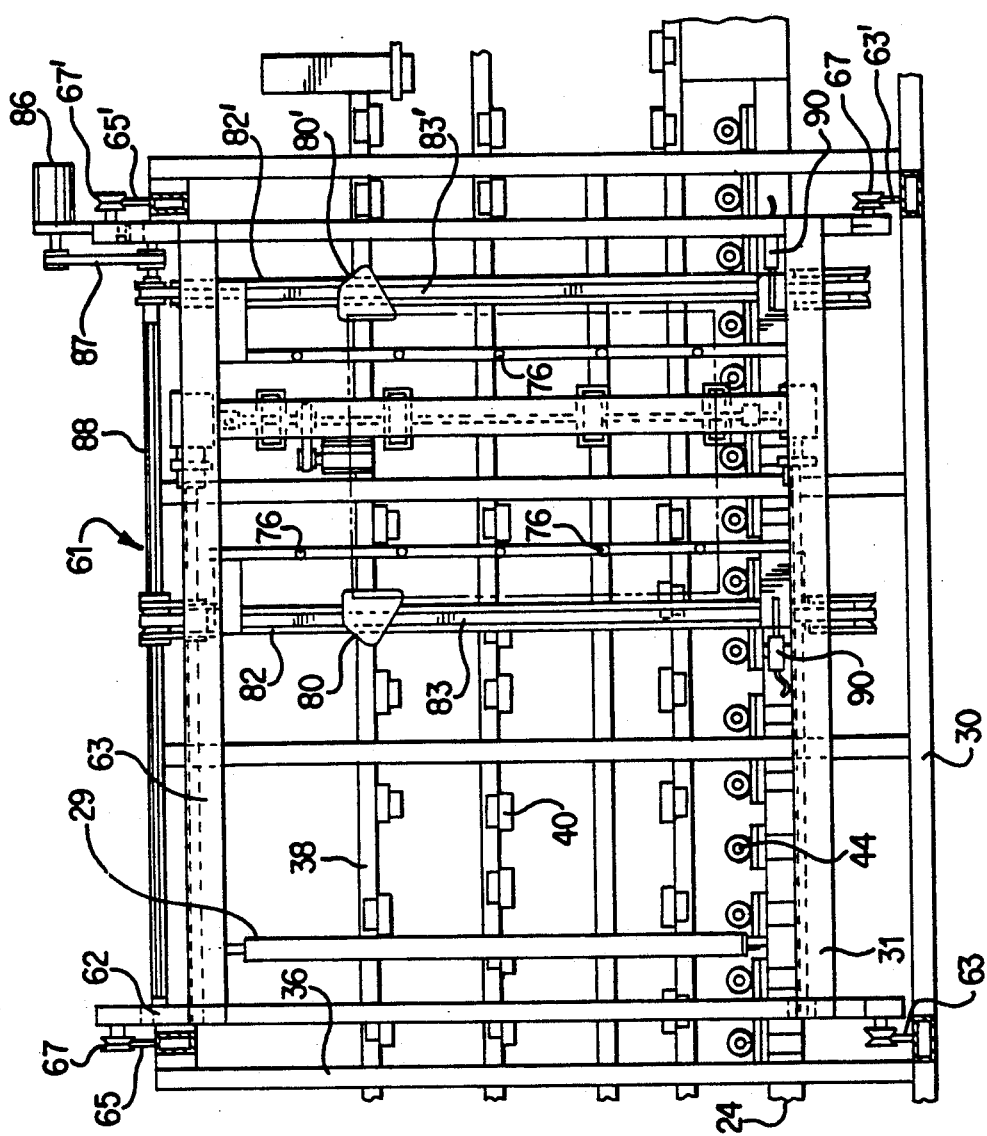
FIG. 5 is a front elevational view showing part of the sealing station of the assembly shown in FIG. 1 and taken generally from section 5 in FIG. 1.
Figure 6:
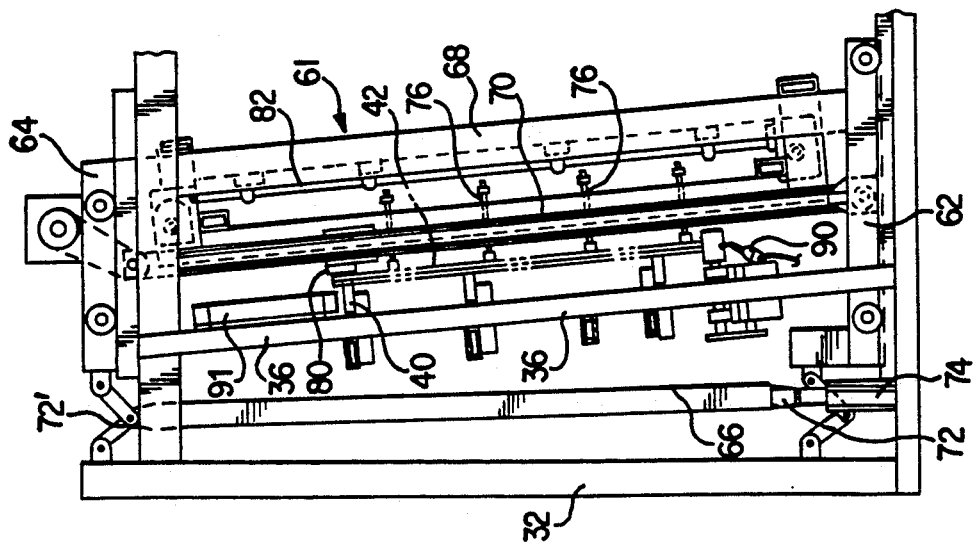
FIG. 6 is a side elevational view of FIG. 5.

The sealing station 16, shown in FIGS. 5-8, includes, in the preferred embodiment, a means 80, 80' for sealing the side edges of sheets 42 and a means 110, 110' for sealing the top and bottom edges of sheets 42. Sealing means 80, 80' and sealing means 110, 110' are arranged herein as two separate operations. Sealing means 80, 80' are mounted on a trolley assembly 61 which moves in and out relative to the first conveying means 24 and the frame. The trolley assembly 61 includes a lower member 62, an upper member 64, an upper cross member 63, and a lower cross member 31. The trolley 61 rides on upper tracks 65 and 65', and lower tracks 63 and 63' which are mounted on the frame on opposite sides of sealing means 80, 80', as shown in FIGS. 5 and 6. The trolley assembly 61 is linked to the frame for movement relative thereto and toward and away from first conveying means 24 by a rear vertical linkage 66, shown in FIG. 6. Tracks 65 and 65' and 63 and 63' are substantially parallel to one another and receive wheels 67 and 67' which support trolley 61 so that trolley 61 rides on rails 63 and 65, and 63' and 65', respectively, to provide horizontal movement of trolley 61 relative to the front frame member 36 and the first conveying means 24. Linkage member 66 is connected at its top to a set of pinned linkages 72' and at its bottom to a piston means 74. Top linkage 72' and bottom linkages 72 connect trolley 61 to member 32 and the frame. When piston means 44 is activated, vertical linkage 66 is moved upwardly and acts to straighten linkages 72' and 72 into a straight line to push trolley assembly 61 outward along rails 63 and 65. The opposite or right side of trolley 61 acts in corresponding manner to achieve a parallelogram movement of trolley assembly 61 outwardly or inwardly relative to glass 42, which is supported on rollers 44. When piston 74 is retracted linkages 72 and 72' collapse and the assembly 61 is moved inwardly toward the first conveying means 24 and rollers 44 carrying the glass 42, which has been moved into position for sealing.

Trolley assembly 61 carries two vertical rows of spring biased plungers 76 mounted on vertical stringers 70 which are parallel to the plane of glass 42. As the trolley assembly 61 moves inwardly toward the frame member 36 and the glass 42, plungers 76 contact the glass 42, so that outer glass member 42a and inner glass member 42b will move as close as possible adjacent to one another and will be held fairly tightly against roller 40. With the glass 42 held in this position, two glue dispensing guns 80, 80', disposed on opposite sides of the glass 42, may be actuated to move downwardly along the side edges of glass 42. These glue or hot melt guns 80, 80' are of conventional manufacture, made by the Nordson Company, and include a port 85 (see FIG. 15) through which a suitable liquified substance, such as the hot glue composition used in this particular process, can be ejected and applied in a bead to a relatively flat surface. Glue guns 80 and 80' are mounted for movement along vertical rail members 82 and 82' and attached to and move with gear belts 83 and 83'. Guns 80 and 80' are moved up and down along rails 82 and 82' by a motor 86 which drives belt 87 and shaft 88 which drives gear belts 83 and 83'. This entire driving means rides on upper trolley member 64 so that it moves as a unit inwardly and outwardly with the trolley assembly 61.

Generally, vertical downward movement of glue guns 80 and 80' is activated as soon as the trolley 61 is moved inwardly so that the plungers 76 contact the outward face of the glass sheets 42. As the guns 80 and 80' are moved downwardly along the opposite sides of the glass 42, a hot glue mixture is ejected in a bead to cover the joint between the two sheets of glass 42a and 42b. This bead effectively joins and seals these pieces of glass, so that etching acid or other liquids will not be able to penetrate to their adjacent inside faces.

As the glue guns 80 and 80' move beyond the bottom edge of the glass 42, they will tend to leave a trail or web of glue, even though glue is no longer being ejected under pressure from the gun. To prevent this trailing web of glue, the present invention includes a pair of spaced web cutting means or winders 90 located below the supporting rollers 44 and in the path of travel of the glue guns. These winders 90, which may simply be rotatable spindles, are activated by an air valve or other suitable means so that they spring across the path the glue gun has just travelled and intercept any tail or web of glue which extends from below the piece of glass or trails from the port of the gun. This causes the web of glue to wrap around the rotating spindle and be broken from the glass 42 and gun 80. Also, to assist in quickly setting the glue, forced air dryers 91 may be located on opposite sides of glass 42 and directed toward the edges. Alternatively, air cooling ducts (not shown), connected to an appropriate air source, may be included on trolley assembly 61 to extend along the opposite side edges of glass 42 to direct air at those edges to set the glue and reduce the process time. Once the sides of the mating glass sheet 42 have been sealed, the glass 42 is moved to the right toward a further sealing means to place glue along the top and bottom edges of glass 42.

Figure 7:
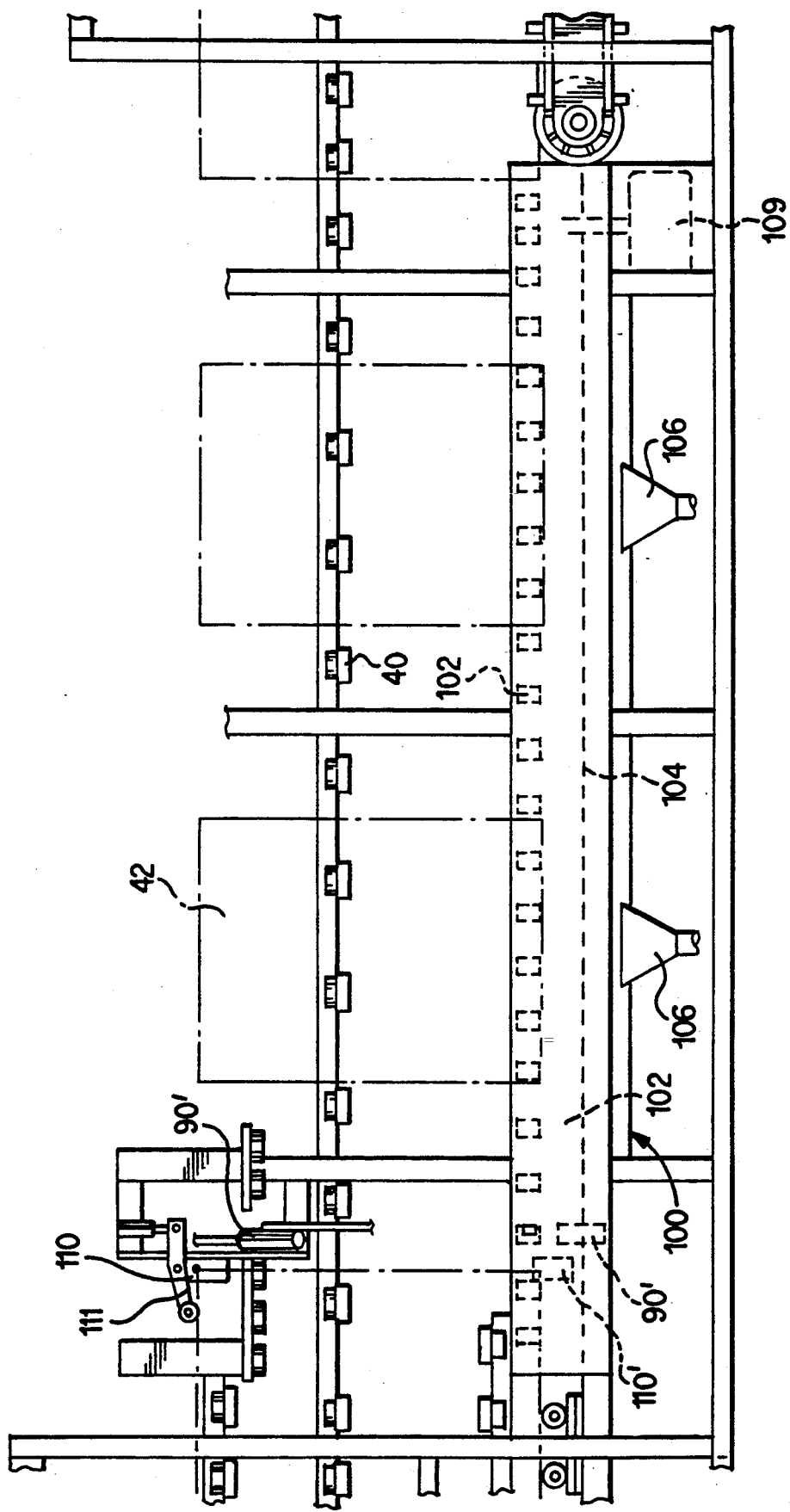
FIG. 7 is a front elevational view of a further portion of the sealing station of the assembly invention shown in FIG. 1 taken generally from section 7.
Figure 9:
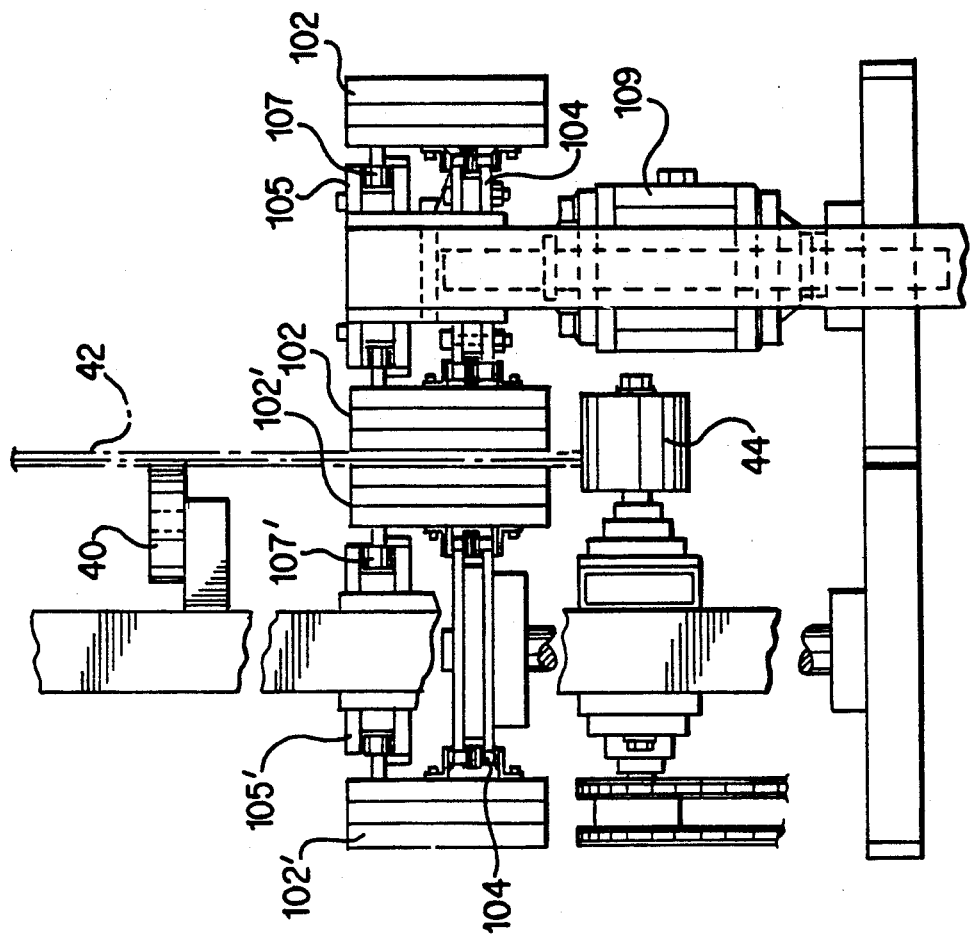
FIG. 9 is an enlarged partial view of a lower portion of FIG. 8.
Figure 8:
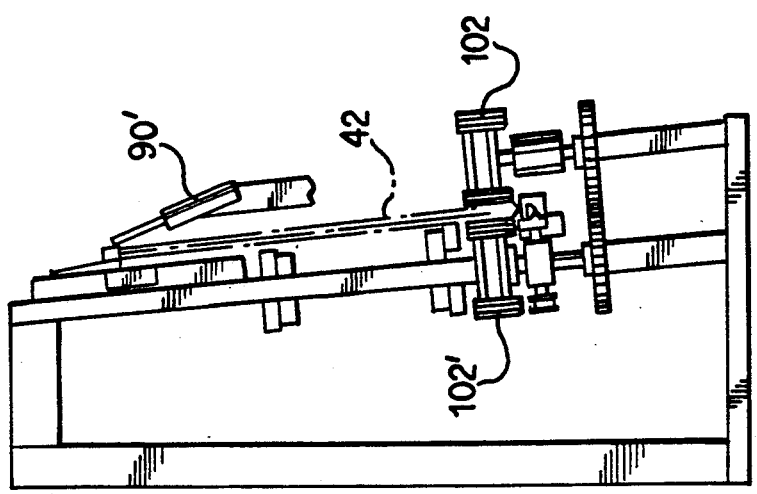
FIG. 8 is a side elevational view taken of FIG. 7.

In order to glue the top and bottom edges of the glass sheets 42, the glass 42 must be removed from the lower supporting rollers 44, which is accomplished by automatically transferring glass 42 to a second conveying means 100, shown in FIGS. 7 to 9. Second conveying means 100 is a dual chain system which includes a plurality of spaced pads 102 mounted on an outer chain 104 (FIG. 9) and corresponding pads 102' mounted on inner chain 104'. These pads 102 and 102' are mounted on chains 104 and 104', respectively, for direct movement therewith. Chains 104 and 104' are driven by motor 109, using shafts linked to achieve opposite rotations at identical speeds so that a pad 102 of chain 104 will always meet a pad 102' of chain 104', as shown in FIG. 9. Each pad 102 and 102' is also supported by a roller 107 which rides in tracks 105 and 105' to assure that each pad presents a flat vertical surface opposite the faces of glass 42. Pads 102 and 102' are positioned above the bottom edge of glass sheets 42 to come in contact with the opposing front and rear faces of glass sheets 42. These pads 102 are resilient so as not to break the glass, but are spaced from one another so as to exert sufficient pressure against these opposing outwardly directed faces of glass 42 so that they grip and move glass sheets 42 off rollers 44 and carry it, in suspension, past glue guns 110 and 110' disposed above and below glass 42, respectively (See FIGS. 7 and 9). Glue guns 110 and 110' are similar in construction to those described above and operate to place a bead of glue along the top and bottom edges of glass sheets 42 to complete the seal around the perimeter of glass sheet 42. The glue guns 110 and 110' may be activated by a limit switch, photodetector or equivalent sensing means 111 which locates glass 42 as it enters the second sealing station (see also FIG. 16). Further air blowers 106 may be placed above and/or below glass sheets 42 to assist in rapidly cooling the bead of glue which has just been placed by guns 110 and 110'. Likewise, additional rotating web cutter 90' is located to intersect and cut the web of glue which may trail the glass pieces 42 both at the top and bottom.

The detail of the pads 102 and 102' which act to support glass 42 through the second gluing station is shown in FIGS. 8 and 9. These pads 102 and 102' are mounted on front and rear chain means 104 and 104' and act together so that pads 102 and 102' move with chains 104 and 104' and meet on opposite sides of glass 42 with a minimal spacing therebetween. Thus, pads 102 and 102' gently squeeze the glass 42 and support and carry it off and beyond rollers 44.

Alternatively, although not shown, it should be understood, the sealing station may consist of a single glue gun wherein the glass sheets are rotatable about the axis perpendicular to their major planar surface so that all glass edges may revolve in a single plane. The single gun may then be utilized to apply a sealant to the top, bottom, and side edges of the glass as it passes the gun.

It should also be noted that the single-sided process of the present invention can produce acceptable results even though some leakage may occur such that the sides of the glass sheets not to be etched are exposed to the etch bath. Such would be the case if only a small amount of etching occurs due to, for example, leakage at the seal area. Since the human eye cannot detect low levels of etching, allowing some level of etching on the inner surfaces of the glass sheets will not prevent the production of good consistent glass products so long as this level of etching remains undetectable to an observer of, for example, an image behind the glass. Thus, in the context of the present invention, the step for providing a substantially or generally fluid-type seal should be considered to include a seal in which some leakage might occur, although the etching produced by such leakage should not be visible to an observer. Such etching is normally not detectable if the gloss level is at least about 90% or higher.

Figure 12:
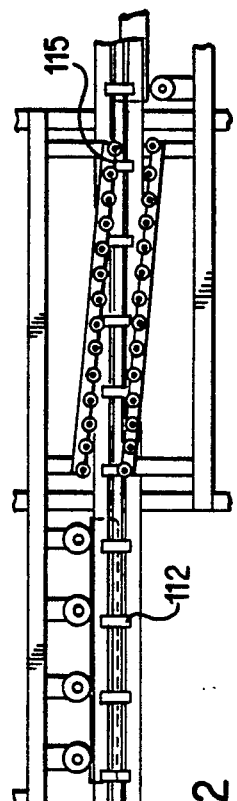
FIG. 12 is a plan view of the second conveying means along line 12—12 of FIG. 10.
Figure 10:
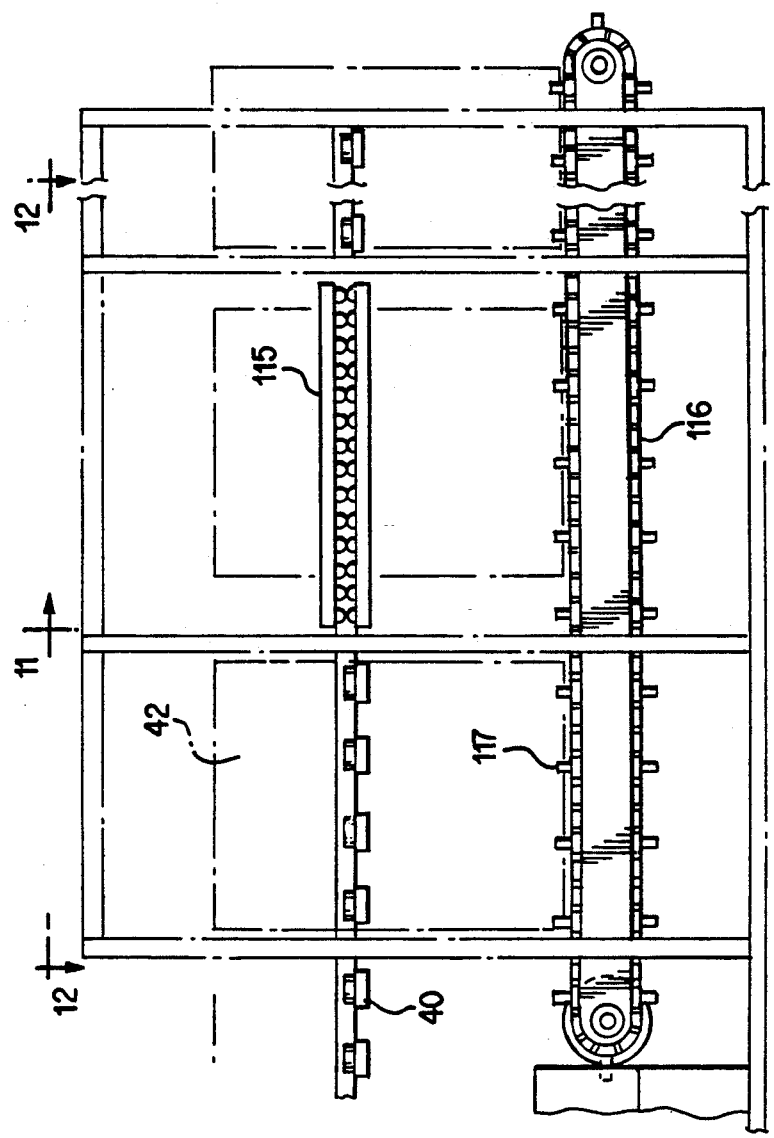
FIG. 10 is a front elevational view of the second conveying means taken generally from section 10 in FIG. 1.
Figure 11:
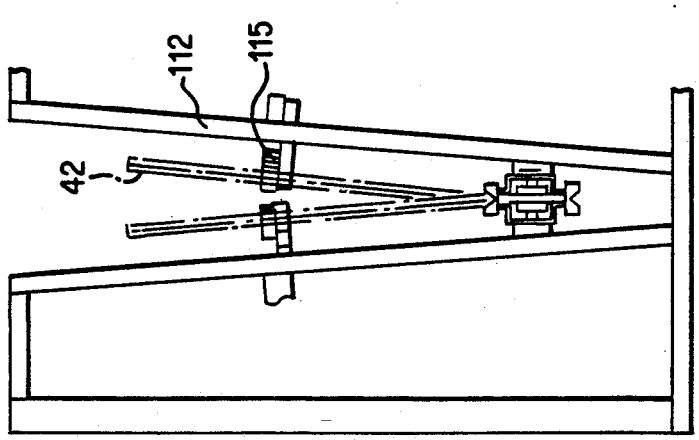
FIG. 11 is a side elevational view taken generally along line 11—11 in FIG. 10.

After the glue bead at the top and bottom edges of glass sheet 42 has been cooled and somewhat hardened, glass sheets 42 are carried by second conveying means 100 to an etching chain assembly 116, as shown in FIGS. 10 to 12, where joined and sealed glass sheets 42 are deposited on a series of notched blocks 117 mounted on chain assembly 116 which moves the glass 42 into position to be carried into the etching tank. It is preferred to move the orientation of sealed glass 42 in this sequence from parallel with frame member 36, as it has been throughout this process, to parallel with member 112, as shown in FIG. 11, to facilitate easier grasping of the glass 42. This is accomplished by a pair of parallel tracks 115 which intersect the plane of the path of glass 42 to tilt the glass as it travels on chain 116.

Figure 13:
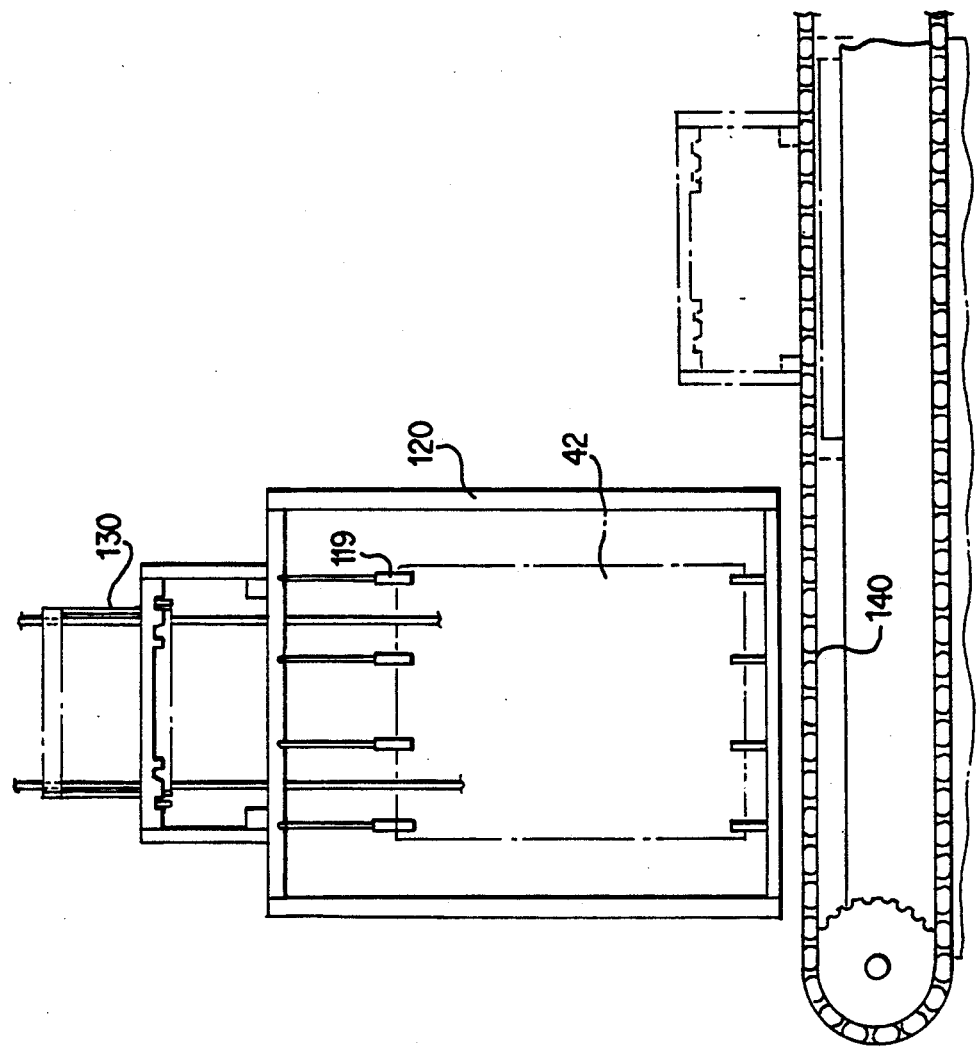
FIG. 13 is a front elevational view of the hanger means taken generally from section 13 in FIG. 1.
Figure 14:
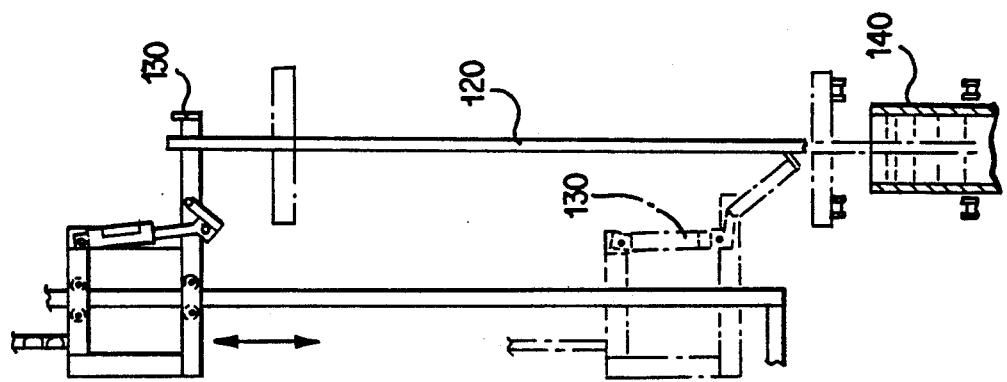
FIG. 14 is a side elevational view of the hanger means in FIG. 13.

As glass 42 approaches the end of the etching chain 116, it is grasped and lifted into clips 119 in a hanging frame 120 which is in turn lifted by an overhead trolley 130 which lowers it into an etching tank 140 (see FIGS. 1 and 13–14). The hanging frame 120 and trolley 130 are of conventional design and have been used for some time in connection with glass etching. They are not critical to this invention, but are merely shown here for the sake of completeness. The frame 120 and glass 42 are moved to the etching tank, as shown in FIG. 1, and indicated in process step 20. The glass is dipped into the tank and moved through the tank by etching conveyor 150 for a required amount of time. Glass 42 is then removed from the tank 140 by the overhead hangar trolley 130 and taken to a rinsing station 21. The rinsing station 21 is not shown, but is again of conventional design and is similar to that used with present etching methods. The glue which has adhered to the perimeter of the glass 42 is then stripped from the glass. The glass sheets 42a and 42b are then separated, washed and dried, as may be necessary, prior to packaging.

The resulting product is two sheets of glass, each of which is etched on one side only. This single side etching process provides a glass sheet with substantially the same non-glare properties as present double-sided etching, but produces two sheets of glass where only one sheet was previously produced. In addition, because only one side is etched, the resolution of the etched sheet of glass is significantly better than that of the double-sided etched glass. Additionally, if the tin side is selectively etched, the product is far superior to that of double-sided etched glass. Finally, because the sealing process is automated, production efficiency is enhanced. More product is produced in the same period of time with less etching solution and labor being required.

In the operation of the process of the subject invention, after the glass to be etched has been polished, similar shaped rectangular sheets of glass are loaded on a first conveying means with their surfaces adjacent one another and their perimeters or outside edges substantially aligned. If a more exact registration of the edges of the pieces is desired, the glass sheets are passed through registration means which align their side, top and bottom edges. The glass is then conveyed to a sealing means which glues the opposite vertical side edges of the two adjacent glass sheets and then the top and the bottom edges of the adjacent glass sheets. The gluing process is such that it effectively places a bead around the perimeter of the glass sheets to not only join them together, but also to seal them together and prevent liquids, such as the etching solution, from entering between the adjacent faces of the glass sheets. The two joined and sealed glass sheets are then conveyed to a conventional etching station where they are dipped in a conventional etching bath. After having been removed from the etching bath (see, e.g., FIG. 17), the sealing bead is stripped from the perimeter of the glass sheets and the sheets are separated.

When discussing a fluid-tight seal, of course, a seal effective against the etching bath is meant. When two glass sheets are placed face to face to close proximity and then immersed in a weak etch bath, such as composed of 32 percent hydrofluoric acid, 15 percent water, 3 percent ammonium biflouride and 50 percent sorbitol (all by weight), a seal can be formed by the etch bath as follows. The weak bath initially seeps between the glass sheets and etches to an unnoticeable extent. This bath is then depleted and the depleted bath acts as an effective seal to prevent the entry and circulation of fresh etching solution. For this phenomenon to work the bath preferably must be very weak as described, and the immersion time can be lengthened, on the order of about 24 seconds, since the seepage acts as a seal after the first few time periods. Additionally, the two sheets of glass must be held or kept in close proximity, preferably touching, along their faces, so minimal seepage occurs and flow of fresh etch bath is minimized by capillary action. Furthermore, the side facing outward—toward the etch bath—should preferably be the air side, and the inside the tin side, such that the side being etched by seeping material is the side more resistant to etching, i.e. the tin side. Only with the tin side oriented inward can a single-sided etch be achieved by using the "proximity seal" approach.

Additionally, another method of effectively realizing a fluid-tight seal is, instead of using two pieces of glass, to substitute one flexible sheet which resists acid etch for one pane of glass, and to use the viscous liquid/capillary attraction seal method and/or glue seal method to achieve a fluid-tight seal. This will protect one surface of the glass from etching. The application and removal of this flexible sheet can be achieved using similar process equipment and process steps as described earlier for the two pane of glass process.

While the subject invention has been described with respect to a number of embodiments thereof, it is recognized that other substantially equivalent means may be employed to achieve the objects of this invention. This specification is not in any way intended to limited the scope of the invention, except as claimed below. For example, means other than glue may be employed to seal the perimeter of the adjacent glass sheets. A tape material, an inert elastic, flexible framing material or other materials which would effectively seal between the glass sheets would be satisfactory. However, from a standpoint of economy, speed in conveying and speed in removing the sealing means from the glass, it has been found that a hot melt glue as described in this particular specification is most advantageous.

What is claimed is:

1. A process for etching only one side of a sheet of glass comprising the steps of:
   providing an etching solution;
   applying a viscous liquid to a major planar surface of a first sheet of glass;
   placing the first sheet of glass and a second sheet of glass having corresponding edges of similar dimensions in a face to face relationship so that the viscous liquid contacts the major planar surface of said first sheet of glass and said second sheet of glass when in said face-to-face relationship;
   maintaining said first sheet of glass in close proximity to said second sheet of glass;
   applying a flexible non-porous sealing means resistant to said etching solution along the edges of said first sheet of glass and said second sheet of glass to provide a fluid tight seal around said edges;
   dipping said first sheet of glass and said second sheet of glass in said etching solution to visibly etch only one side of said first sheet of glass and only one side of said second sheet of glass;

removing said sealing means from said edges of said first sheet of glass and said second sheet of glass; and thereafter separating said first and second sheets of glass.

2. The process for etching glass set forth in claim 1 including aligning said corresponding edges of said first sheet of glass and said second sheet of glass.

3. The process for etching glass set forth in claim 1 wherein said sheets of glass are placed together such that the tin or uncut sides of said sheets of glass face one another.

4. A process for etching only one side of a piece of glass comprising the steps of:

providing an etching solution;

placing at least a first sheet of glass and a second sheet of glass having corresponding edges of similar dimensions in face to face relationship;

applying a viscous liquid to a major planar surface of at least one of the sheets of glass so that the viscous liquid contacts at least a portion of the major planar surface of said first sheet of glass and said second sheet of glass when in said face to face relationship;

maintaining said first sheet of glass in close proximity to said second sheet of glass;

applying a glue composition, resistant to said etching solution, to said corresponding edges of said first sheet of glass and said second sheet of glass to provide a fluid tight seal around said edges;

dipping said first sheet of glass and said second sheet of glass in said etching solution to visibly etch only one side of said first sheet of glass and only one side of said second sheet of glass;

removing said glue composition from said corresponding edges of said first sheet of glass and said second sheet of glass; and thereafter separating said first and second sheets of glass.

5. The process for etching glass set forth in claim 4 including aligning said corresponding edges of said first sheet of glass and said second sheet of glass prior to applying said glue composition.

6. The process of etching glass set forth in claim 4 wherein said sheets of glass are joined together such that the air or cut sides thereof are in said face to face relationship.

7. A process for simultaneously etching at least two separate sheets of glass on only one side of each sheet, each of said sheets having an outside face to be exposed to an etching solution and an inside face not to be exposed to said etching solution comprising the steps of:

placing said sheets of glass to be etched so that their inside edges are generally facing one another and the edges of each sheet generally correspond to the edges of other sheets;

applying a viscous liquid to the inside face of one of the sheets of glass prior to said placing step so that the viscous liquid contacts the inside faces of said sheets of glass when they are brought into contact with one another;

conveying said sheets of glass to be etched into a joining station;

registering said sheets of glass with one another so that corresponding edges thereof are aligned with one another;

sealing said corresponding edges of said sheets of glass in a substantially fluid-tight relationship with each other by applying a flexible non-porous sealing means resistant to said etching solution around said corresponding edges;

conveying said sheets of glass to an etching station;

dipping said joined sheets into said etching solution so that their outside faces are exposed to said etching solution; and separating said individual sheets of glass by removing said flexible non-porous sealing means.

8. The process for etching glass set forth in claim 7 wherein said sheets of glass are joined together such that the air or cut sides thereof are in said face to face relationship.

* * * * *